United States Patent [19]

Hayama et al.

[11] Patent Number: 5,049,629

[45] Date of Patent: Sep. 17, 1991

[54] COLOR DEVELOPER FOR PRESSURE-SENSITIVE COPYING PAPER

[75] Inventors: Kazuhide Hayama; Yukio Saitoh, both of Mie, Japan

[73] Assignee: Mitsubishi Petrochemical Co., Ltd., Tokyo, Japan

[21] Appl. No.: 431,232

[22] Filed: Nov. 3, 1989

[30] Foreign Application Priority Data

Nov. 18, 1988 [JP] Japan ................................ 62-290055

[51] Int. Cl.$^5$ ..................... C08G 8/28; C08G 14/04; C08L 61/14; C08L 85/00
[52] U.S. Cl. ................................... 525/506; 528/129; 528/155
[58] Field of Search ................. 525/506; 528/155, 129

[56] References Cited

U.S. PATENT DOCUMENTS

| | | | |
|---|---|---|---|
| 4,173,684 | 11/1979 | Stolfo | 428/531 |
| 4,620,874 | 11/1986 | Booth, Jr. et al. | 106/21 |
| 4,839,457 | 6/1989 | Hayama et al. | 528/155 |

FOREIGN PATENT DOCUMENTS

| | | |
|---|---|---|
| 0005975 | 12/1979 | European Pat. Off. . |
| 0166519 | 1/1986 | European Pat. Off. . |
| 0194601 | 9/1986 | European Pat. Off. . |
| 1348363 | 3/1974 | United Kingdom . |
| 1564850 | 4/1980 | United Kingdom . |
| 1601535 | 10/1981 | United Kingdom . |
| 2073226 | 10/1981 | United Kingdom . |
| 2202230 | 9/1988 | United Kingdom . |

Primary Examiner—John Kight, III
Assistant Examiner—Kathryne Shelborne
Attorney, Agent, or Firm—Oblon, Spivak, McClelland, Maier & Neustadt

[57] ABSTRACT

A color developer for pressure-sensitive copying paper is disclosed, containing a polyvalent metal-modification product of a p-substituted phenolformaldehyde condensate substantially terminated with an o-substituted phenol nucleus, with a content of a condensate component in which each of both terminal phenol nuclei thereof has a hydrogen atom at the o-position being not more than 20% by weight based on the total condensate. The color developer exhibits excellent color developability, undergoes no yellowing, and provides a color image having excellent water resistance.

5 Claims, No Drawings

COLOR DEVELOPER FOR PRESSURE-SENSITIVE COPYING PAPER

FIELD OF THE INVENTION

This invention relates to a color developer for pressure-sensitive copying paper, particularly a color developer for pressure-sensitive copying paper which is free from yellowing in the color developing layer and excellent in color developability.

BACKGROUND OF THE INVENTION

Pressure-sensitive copying paper, also called noncarbon paper, comprises an upper sheet coated with a dispersion of microcapsules containing an electron donating colorless dye solution and a lower sheet coated with a dispersion of an electron accepting color developer and, if desired, an intermediate sheet coated on each side thereof the microcapsule dispersion and the color developer dispersion, respectively. On application of pressure, the microcapsules are ruptured, and the colorless dye reacts with the color developer to form a color image.

Known color developers which have been put into practical use include inorganic solid acids, e.g., active clay, acid clay, and attapulgite (see U.S. Pat. No. 2,712,507), p-substituted phenolic resins, e.g., p-phenylphenol-formaldehyde condensates (see JP-B-42-30144, the term "JP-B" as used herein means an "examined Japanese patent publication"), aromatic carboxylic acid metal salts, e.g., zinc 3,5-di-$\alpha$-methylbenzylsalicylate (see JP-B-49-10856 and JP-B-52-1327), and metal salts of phenolic resins, e.g., a zinc-modified p-phenylphenol-formaldehyde condensate (see JP-B-55-25998). However, the inorganic solid acids, though rapidly acting in color formation, adsorb gases or water content in air during preservation to reduce the color developability. The p-substituted phenolic resins, e.g., p-phenylphenol-formaldehyde condensates, though excellent in color developability, undergo yellowing on exposure to light or gases in air. The zinc modified p-phenylphenol-formaldehyde resins suffer from more serious yellowing. Further, although the aromatic carboxylic acid metal salts exhibit excellent color developability and freedom from yellowing, they have disadvantages of poor developed image water-resistance and expensiveness.

SUMMARY OF THE INVENTION

An object of this invention is to provide a color developer for pressure-sensitive copying paper, which is free from yellowing and excellent in color developability and stability after color development.

The inventors have conducted extensive investigations and, as a result, it has now been found that the above object of this invention is accomplished by a color developer containing a polyvalent metal-modification product, inclusive of a polyvalent metal salt and a polyvalent metal complex, of a specific phenol-formaldehyde condensate.

The present invention relates to a color developer for pressure-sensitive copying paper, which contains a polyvalent metal-modification product of a p-substituted phenol-formaldehyde condensate substantially terminated with an o-substituted phenol nucleus, with a content of a condensate component in which each of both terminal phenol nuclei thereof has a hydrogen atom at the o-position being not more than 20% by weight based on the total condensate.

DETAILED DESCRIPTION OF THE INVENTION

The substituent at the o-position of the p-substituted phenol-formaldehyde condensate is selected taking into consideration toxicity, solubility in a dye solvent, and the like. Preferred o-substituents are alkyl group having from 1 to 12 carbon atoms, aryl groups having from 6 to 12 carbon atoms, and aralkyl groups having from 7 to 12 carbon atoms. The o-substituents at both terminals may be the same or different. Likewise, the p-substituent of the p-substituted phenol nucleus unit constituting the p-phenol-formaldehyde condensate is preferably selected from an alkyl group having from 1 to 12 carbon atoms, an aryl group having from 6 to 12 carbon atoms, and an aralkyl group having from 7 to 12 carbon atoms.

The p-substituted phenol-formaldehyde condensate which can be used in the present invention can generally be prepared by, for example, (1) a method comprising condensating a combination of a p-substituted phenol and a 2,4-disubstituted phenol with formaldehyde in the presence of an acid catalyst, (2) a method comprising a first step of condensating a p-substituted phenol and formaldehyde in the presence of an acid catalyst and a second step of condensating a 2,4-disubstituted phenol and formaldehyde, if necessary, in the presence of an additionally supplied acid catalyst, and (3) a method comprising condensating a p-substituted phenol and formaldehyde in the presence of an acid catalyst and then adding an unsaturated olefin compound to thereby introduce a substituent to the o-position of at least one of the terminal phenol nuclei of the resulting p-substituted phenol-formaldehyde condensate.

The amount of the 2,4-disubstituted phenol to be used in the methods (1) and (2) is determined so that the resulting condensate may contain a condensate component in which the o-position of each of both terminal phenol nuclei is a hydrogen atom in a proportion of not more than 20% by weight based on the total condensate. More specifically, the 2,4-disubstituted phenol is preferably used in an amount of at least 1 mole, more preferably rom 1.5 to 2.5 mols, per mol of the p-substituted phenol or the p-substituted phenol-formaldehyde initial condensate.

The amount of the unsaturated olefin compound to be used in the method (3) is also determined so as to satisfy the above-described requirement as in the methods (1) and (2). More specifically, it is in the range of from 1.2 to 2.0 mols per mol of the p-substituted phenol-formaldehyde initial condensate.

Suitable p-substituted phenols which can be used in the preparation of the p-substituted phenol-formaldehyde condensate according to the methods (1) to (3) include p-alkylphenols, e.g., p-cresol, p-ethylphenol, p-isopropylphenol, p-t-butylphenol, p-sec-butylphenol, p-t-amylphenol, p-hexylphenol, p-t-octylphenol, p-nonylphenol, and p-dodecylphenol; p-aralkylphenols, e.g., p-benzylphenol, p-$\alpha$-methylbenzylphenol, and p-$\alpha,\alpha$-dimethylbenzylphenol; and p-arylphenols, e.g., p-phenylphenol.

Suitable 2,4-disubstituted phenols which can be used in the preparation of the p-substituted phenol-formaldehyde condensate include 2,4-dialkylphenols, e.g., 2,4-xylenol, 2,4-diethylphenol, 2,4-diisopropylphenol, 2,4-di-t-butylphenol, 2,4-di-t-amylphenol, and 2,4-di-t-octylphenol, diarylphenols, e.g., 2,4-diphenylphenol;

and 2,4-diaralkylphenols, e.g., 2,4-dibenzylphenol, 2,4-di-α-methylbenzylphenol, and 2,4-di-α, α-dimethylbenzylphenol.

Suitable unsaturated olefin compounds which can be used in the method (3) include isobutylene, diisobutylene, styrene, and α-methylstyrene.

The p-substituted phenol-formaldehyde condensate which can be used in the present invention are generally called novolak resins, and an acid catalyst is used in the preparation thereof as stated above. Any acid catalyst which is commonly employed, e.g., hydrochloric acid, phosphoric acid, oxalic acid and p-toluenesulfonic acid, can be used in this invention.

The formaldehyde source which can be used in the preparation of the p-substituted phenol-formaldehyde condensate includes a formaldehyde aqueous solution, paraformaldehyde, and other compounds capable of easily producing formaldehyde. The amount of the formaldehyde source is preferably determined so that the resulting p-substituted phenol-formaldehyde condensate having an o-substituent at their terminals may have about 3 to 5 phenol nucleus units in average.

In the above-described synthesis of the p-substituted phenol-formaldehyde condensate according to the present invention, it is necessary to control the content of a component whose both terminals have a hydrogen atom at the o-position thereof (i.e., a general p-substituted phenol-formaldehyde condensate) not to exceed 20% by weight, preferably not to exceed 10% by weight. In other words, the product must mainly comprise a component in which at least one of the terminals thereof has a substituent at the o-position. Accordingly, as the proportion of the component having a hydrogen atom at the o-position of each of the terminals thereof increases, the yellowing phenomenon of a color developing layer becomes conspicuous.

The color developer according to the present invention is obtained by modifying the o-substituted phenol-terminated p-substituted phenol-formaldehyde condensate with a polyvalent metal. Modification with a polyvalent metal can be carried out by various methods inclusive of known ones. Suitable methods include (1) a method comprising slowing adding an ammonium compound, e.g., ammonium hydrogencarbonate, ammonium carbonate, and ammonium acetate, and a polyvalent metal salt, e.g., zinc dibenzoate, zinc hydroxylbenzoate, zinc formate, zinc acetate, and zinc propionate, to the phenol-formaldehyde condensate, followed by hot-melt reaction at 130° C. to 200° C., (2) a method comprising slowly adding zinc oxide or zinc carbonate and an ammonium salt of benzoic acid or formic acid to the phenol-formaldehyde condensate, followed by hot-melt reaction at 130° C. to 200° C., and (3) a method comprising dissolving the phenol-formaldehyde condensate in water or a hydrophilic solvent, e.g., methanol and ethanol, containing sodium hydroxide, potassium hydroxide, etc. to form a solution of a phenolate of the condensate and adding a solution of a polyvalent metal salt, e.g., zinc chloride, in water or a hydrophilic solvent to the phenolate solution to effect a metathetical reaction.

The polyvalent metal which can be used for modification of the phenol-formaldehyde condensate includes nickel, zinc, magnesium, and aluminum, with zinc being the most preferred in view of the excellent performance properties of the resulting color developer.

The polyvalent metal is usually used in an amount of from 1 to 10 parts by weight per 100 parts by weight of the phenol-formaldehyde condensate.

A color developing sheet (lower sheet) for pressure-sensitive copying paper can be prepared using the thus obtained color developer compound (polyvalent metal-modified condensate) by (1) a method in which a support is coated with an aqueous coating composition containing the color developer compounds in the form of an aqueous fine suspension or (2) a method in which a support is coated with an organic solvent solution containing the color developer compound. In the former method using an aqueous coating composition, which is commonly employed, the color developer compound is dispersed in the presence of a dispersing agent in a sand grinding mill, a ball mill, an attritor, etc. to prepare an aqueous fine suspension. If desired, the aqueous fine suspension of the color developer compound may contain inorganic pigments, e.g., bentonite, silica, kaolin, talc, and calcium carbonate; organic high polymeric pigments, e.g., polystyrene; water-soluble or water-dispersible binders, e.g., styrene-butadiene latices (SBR), oxidized starch, and polyvinyl alcohol; pigments dispersants, and other additives.

The aqueous coating composition is coated on a support, such as paper, using a coating machine, e.g., an air knife coater, a blade coater, a roll coater, or a gravure coater.

The present invention is now illustrated in greater detail with reference to the following Examples and Comparative Examples, but it should be understood that the present invention is not construed as being limited thereto. Unless otherwise indicated, all the parts, percents and ratios in these examples are given by weight.

EXAMPLE 1

In a glass-made flask were charged 85 g of p-phenylphenol, 206 g of 2,4-di-t-butylphenol, 32.6 g of 92% paraformaldehyde, 2.3 g of p-toluenesulfonic acid, and 490 g of benzene, and a condensation reaction was conducted for 5 hours by stirring at 70° to 82° C. while removing the produced water as an azeotrope with a part of benzene and returning the benzene to the flask by refluxing.

After completion of the reaction, benzene was removed by distillation, and the inner temperature was raised to 170° C. A uniform mixture of 46 g of ammonium benzoate and 27 g of zinc oxide was added to the reaction mixture in small portions over a period of 1 hour, followed by effecting modification at that temperature for 4 hours to obtain 360 g of a zinc-modified phenol-formaldehyde condensate.

The phenol-formaldehyde condensate before zinc modification was trimethylsilylated and analyzed by gas chromatography. As a result, the content of the p-phenylphenol-formaldehyde condensate component having no 2,4-di-ti-butylphenol added to both terminals thereof was found to be about 4%.

EXAMPLE 2

In a glass-made flask were charged 85 g of p-phenylphenol, 122 g of 2,4xylenol, 32.6 g of 92% paraformaldehyde, 1.7 g of p-toluenesulfonic acid, and 360 g of benzene, and a condensation reaction was conducted in the same manner as in Example 1.

The resulting condensate was analyzed in the same manner as in Example 1. As a result, the content of the p-phenylphenol-formaldehyde condensate component having no 2,4-xylenol added to both terminals thereof was found to be about 6%.

After completion of the condensation reaction, benzene was removed from the reaction mixture by distillation, and the inner temperature was elevated to 170° C. A mixture of 80 g of zinc benzoate and 39 g of ammonium bicarbonate was added to the residual mixture in small portions over 1 hour, and a modification reaction was conducted at that temperature for 4 hours to obtain 285 g of a zinc-modified phenol-formaldehyde condensate.

EXAMPLE 3

In a glass-made-flask were charged 153 g of p-phenylphenol, 196 g of 92% paraformaldehyde, 1.2 g of p-toluenesulfonic acid, and 450 g of benzene, and a first condensation reaction was conducted for 4 hours by stirring at 70° to 82° C. while removing produced water as an azeotrope with part of benzene and returning the benzene to the flask by refluxing. Then, 124 g of 2,4-di-t-butylphenol, 19.6 g of 92% paraformaldehyde, and 1 g of p-toluenesulfonic acid were additionally fed to the flask, and a second condensation reaction was conducted for 4 hours in the same manner as described above.

The resulting condensate was analyzed in the same manner as in Example 1. As a result, the content of a p-phenylphenol-formaldehyde condensate component having no 2,4-di-t-butylphenol added to both terminals thereof was found to be about 8%.

After completion of the second condensation reaction, the benzene was removed by distillation, and the inner temperature was raised to 170° C. A uniform mixture of 28 g of ammonium benzoate and 17 g of zinc oxide was added to the reaction mixture in small portions over 1 hour, and the reaction mixture was maintained at that temperature for an additional period of 4 hours to effect modification to obtain 320 g of a zinc-modified phenol-formaldehyde condensate.

EXAMPLE 4

In a glass flask were charged 75 g of p-t-butylphenol, 206 g of 2,4-di-t-butylphenol, 32.6 g of 92% paraformaldehyde, 2.2 g of p-toluenesulfonic acid, and 470 g of benzene, and a condensation reaction was conducted in the same manner as in Example 1.

As a result of analysis of the resulting condensate in the same manner as in Example 1, the content of the p-t-butylphenol-formaldehyde condensate component having no 2,4-di-t-butylphenol added to both terminals was found to be about 6%.

After completion of the condensation reaction, the benzene was removed from the reaction mixture by distillation, the temperature was raised to 170° C. A uniform mixture of 51 g of benzoic acid, 36 g of zinc oxide, and 33 g of ammonium bicarbonate was added to the residual mixture over 1 hour, followed by maintaining the mixture at that temperature for 4 hours to effect modification to obtain 360 g of a zinc-modified phenol-formaldehyde condensate.

COMPARATIVE EXAMPLE 1

In a glass-made flask were charged 170 g of p-phenylphenol, 21.7 g of 92% paraformaldehyde, 1.4 g of p-toluenesulfonic acid, and 280 g of benzene, and a condensation reaction was conducted in the same manner as in Example 1.

After removal of the benzene by distillation, the temperature of the reaction mixture was raised to 170° C., and a uniform mixture of 28 g of ammonium benzoate and 16 g of zinc oxide was added thereto in small portions over 1 hour. The mixture was maintained at that temperature for 4 hours to effect modification to obtain 210 g of a zinc-modified phenol-formaldehyde condensate.

COMPARATIVE EXAMPLE 2

In a glass-made flask were charged 170 g of p-phenylphenol, 82.4 g of 2,4-di-t-butylphenol, 27.4 g of 92% paraformaldehyde, 2.0 g of p-toluenesulfonic acid, and 380 g of benzene, and a condensation reaction was conducted in the same manner as in Example 1.

The resulting condensate was analyzed in the same manner as in Example 1. As a result, the content of the p-phenylphenol-formaldehyde condensate component having no 2,4-di-t-butylphenol added to both terminals thereof was found to be about 35 %.

After completion of the condensation reaction, the benzene was removed from the reaction mixture by distillation, and the inner temperature was raised to 170° C. A mixture of 42 g of ammonium benzoate and 25 g of zinc oxide was added to the residual mixture in small portions over 1 hour, followed by maintaining the mixture at that temperature for 4 hours to effect modification to obtain 310 g of a zinc-modified phenol-formaldehyde condensate.

Each of the zinc-modified phenol-formaldehyde condensates prepared in Example 1 to 4 and Comparative Examples 1 and 2 was evaluated for performance properties as color developer for pressure-sensitive copying paper as follows. For further comparison, the unmodified phenol-formaldehyde condensate as obtained in Example 1; after removal of benzene, in Comparative Example 3 an zinc 3,5-di-t-butylsalicylate in Comparative Example 4 were similarly evaluated. The results obtained are shown in Table 1 below.

1) Preparation of Aqueous Coating Composition

To 38 parts of each color developer compound were added 2 parts of modified polyvinyl alcohol and 60 parts of water, and the mixture was grounded in a small-sized sand mill to prepare a fine dispersion of the color developer compound having an average particle size of about 2 μm. An aqueous coating composition was prepared using the resulting color developer compound dispersion and the following components.

Composition

| | |
|---|---|
| Color developer aqueous dispersion (38%) | 6 g |
| Kaolin (average particle size: 2 μm) | 12 g |
| Calcium carbonate | 3 g |
| (average particle size: 1.5 μm) | |
| SBR latex (50%) | 3 g |
| Oxidized starch (10%) | 15 g |
| Water | 43 g |

2) Preparation of Color Developing Sheet

The aqueous coating composition was coated on fine paper having a basic weight of 4 g/m² with a bar coater to a dry coverage of 4 g/m², followed by drying at 100° C. for 1 minute to obtain a color developing sheet (lower sheet).

3) Test of Color Developability

An upper sheet (blue color) of commercially available pressure-sensitive recording paper ("NCR N-40"

produced by Mitsubishi Paper Mills, Ltd.) was superposed on the above-prepared color developing sheet in such a manner that the coated layers of both sheets contacted with each other. Pressure was applied thereon using an iron pressure roll to cause color development. The reflectances, of the color developing sheet before and after the color development treatment, were measured with a photovolt type reflectometer (using an amber filter), and a rate of color development was obtained from the reflectances according to this equation:

Rate of Color Development $(\%) = (I_0 - I)/I_0 \times 100$ where $I_0$ is a reflectance before the color development treatment; and $I$ is a reflectance after a prescribed time from the color development treatment.

The higher the rate of color development, the higher the color developability.

4) Test of Yellowing

Four color developing sheets were laid up, and a Hunter whiteness was measured with a photoelectric colorimeter to obtain an initial whiteness $K_0$. The test sheets were allowed to stand in a container filled with 3,000 ppm of $NO_x$ gas for 10 minutes and then a Hunter whiteness was measured in the same manner as above to obtain a whiteness after yellowing $K$. The degree of yellowing was evaluated in terms of a whiteness retention (%) calculated from the following equation. The higher the whiteness retention, the lesser the yellow discoloration.

Whiteness Retention$(\%) = K/K_0 \times 100$

5) Test of Water-Resistance of Image

A color image was developed on the color developing sheet in the same manner as in 3 above. After allowing to stand for 48 hours, the sheet having the image was soaked in water for 2 hours. The reflectance of the color developing sheet before the color development treatment $I_0$, that before soaking $I'$ and that after the soaking $I''$ were measured with a photovolt type reflectometer. Water-resistance of the image was evaluated in terms of an image retention (%) calculated according to this equation:

Image Retention $(\%) = (I_0 - I'')/(I_0 - I') \times 100$

TABLE 1

| Example No. | Rate of Color Development | | Whiteness Retention (%) | Image Retention (%) | Remarks |
|---|---|---|---|---|---|
| | After 15 Secs. (%) | After 24 Hrs. (%) | | | |
| Example 1 | 56.6 | 64.0 | 91.1 | 94.3 | |
| Example 2 | 54.2 | 64.1 | 93.7 | 93.7 | |
| Example 3 | 53.8 | 62.5 | 91.3 | 96.8 | |
| Example 4 | 50.4 | 61.9 | 92.2 | 92.4 | |
| Comparative Example 1 | 54.2 | 64.3 | 70.4 | 95.8 | poor yellowing resistance |
| Comparative Example 2 | 54.2 | 63.5 | 80.7 | 94.5 | poor yellowing resistance |
| Comparative Example 3 | 26.6 | 30.6 | 92.0 | — | poor color developability |
| Comparative Example 4 | 42.3 | 61.6 | 94.2 | 44.4 | poor water resistance |

As can be seen from the results of Table 1, the color developer for pressure-sensitive copying paper according to the present invention exhibits a high rate of color development, that is, develops a color image of high density immediately after rupturing of microcapsules on pressure application. Further, the color developer of this invention has excellent yellowing resistance, providing a color developing sheet (lower sheet) which is protected from yellowing due to absorbing oxidizing $NO_x$ gas, etc. during preservation. Furthermore, the color developer of this invention provides a color image excellent in water resistance.

While the invention has been described in detail and with reference to specific embodiment thereof, it will be apparent to one skilled in the art that various changes and modifications can be made therein without departing from the spirit and scope thereof.

What is claimed is:

1. A color developer for pressure-sensitive copying paper, which contains a polyvalent metal-modification product of a p-substituted phenol-formaldehyde condensate substantially terminated with an o-substituted phenol nucleus, with a content of a condensate component in which each of both terminal phenol nuclei thereof has a hydrogen atom at the o-position being not more than 20% by weight based on the total condensate.

2. A color developer for pressure-sensitive copying paper as claimed in claim 1, wherein said o-substituted phenol nucleus is a phenol nucleus having a substitutent selected from the group consisting of an alkyl group having from 1 to 12 carbon atoms, an aryl group having from 6 to 12 carbon atoms, and an aralkyl group having from 7 to 12 carbon atoms, the substituents at both terminals being the same or different.

3. A color developer for pressure-sensitive copying paper as claimed in claim 1, wherein the p-substituted phenol is a phenol having a p-substituent selected from the group consisting of an alkyl group having from 1 to 12 carbon atoms, an aryl group having from 6 to 12 carbon atoms, and an aralkyl group having from 7 to 12 carbon atoms.

4. A color developer for pressure-sensitive copying paper as claimed in claim 1, wherein said polyvalent metal is zinc.

5. A color developer for pressure-sensitive copying paper as claimed in claim 1, wherein the content of the condensate component in which each of both terminal phenol nuclei thereof has a hydrogen atom at the o-position is not more than 10% by weight based on the total condensate.

* * * * *